United States Patent
Wang et al.

(10) Patent No.: US 12,520,298 B2
(45) Date of Patent: *Jan. 6, 2026

(54) RECEIVER BEAMFORMING AND ANTENNA PANEL SWITCHING IN ADVANCED NETWORKS

(71) Applicant: AT&T Intellectual Property I, L.P., Atlanta, GA (US)

(72) Inventors: Xiaoyi Wang, Austin, TX (US); Arunabha Ghosh, Austin, TX (US); SaiRamesh Nammi, Austin, TX (US); Salam Akoum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 386 days.

This patent is subject to a terminal disclaimer.

(21) Appl. No.: 18/173,028

(22) Filed: Feb. 22, 2023

(65) Prior Publication Data

US 2023/0199742 A1    Jun. 22, 2023

Related U.S. Application Data

(63) Continuation of application No. 16/440,847, filed on Jun. 13, 2019, now Pat. No. 11,622,352.
(Continued)

(51) Int. Cl.
*H04W 72/044* (2023.01)
*H04W 24/02* (2009.01)
(Continued)

(52) U.S. Cl.
CPC ......... *H04W 72/046* (2013.01); *H04W 24/02* (2013.01); *H04W 72/02* (2013.01);
(Continued)

(58) Field of Classification Search
CPC ... H04W 72/046; H04W 72/23; H04W 24/02; H04W 72/02; H04W 84/042; H04W 88/02

See application file for complete search history.

(56) References Cited

U.S. PATENT DOCUMENTS 7,916,081 B2   3/2011  Lakkis
8,116,694 B2   2/2012  Kaaja et al.
(Continued)

FOREIGN PATENT DOCUMENTS

EP    3381134 A1   10/2018
WO    2017192889 A1   11/2017
(Continued)

OTHER PUBLICATIONS

U.S. Appl. No. 16/440,847, filed Jun. 13, 2019.
(Continued)

*Primary Examiner* — Mewale A Ambaye

(57) ABSTRACT

Facilitating receiver beamforming and antenna panel switching in advanced networks (e.g., 4G, 5G, and beyond) is provided herein. Operations of a system can include performing a receiver beam evaluation procedure that determines whether a receiving beam is to be changed from a first receiving beam to a second receiving beam. The operations can also include transmitting, to a network device, a request for permission to perform a beam management procedure that switches the receiving beam from the first receiving beam to the second receiving beam. Further, the operations can include receiving, from the network device, a response to the request. The response can include an indication of an action to be performed based on a result of the receiver beam evaluation procedure.

17 Claims, 10 Drawing Sheets

Related U.S. Application Data

(60) Provisional application No. 62/738,683, filed on Sep. 28, 2018.

(51) Int. Cl.
  *H04W 72/02* (2009.01)
  *H04W 72/23* (2023.01)
  *H04W 84/04* (2009.01)
  *H04W 88/02* (2009.01)

(52) U.S. Cl.
  CPC .......... *H04W 72/23* (2023.01); *H04W 84/042* (2013.01); *H04W 88/02* (2013.01)

(56) References Cited

U.S. PATENT DOCUMENTS

| | | |
|---|---|---|
| 9,100,068 B2 | 8/2015 | Lakkis |
| 9,100,100 B2 | 8/2015 | Shi et al. |
| 9,191,079 B2 | 11/2015 | Wu et al. |
| 9,680,219 B2 | 6/2017 | Filipovic et al. |
| 9,872,296 B2 | 1/2018 | Raghavan et al. |
| 2017/0359106 A1 | 12/2017 | John et al. |
| 2018/0138962 A1 | 5/2018 | Islam et al. |
| 2018/0191422 A1 | 7/2018 | Xia et al. |
| 2018/0206132 A1 | 7/2018 | Guo et al. |
| 2018/0227899 A1 | 8/2018 | Yu et al. |
| 2018/0249526 A1 | 8/2018 | Nagaraja et al. |
| 2018/0288757 A1 | 10/2018 | Sun et al. |
| 2018/0302889 A1 | 10/2018 | Guo et al. |
| 2019/0124638 A1* | 4/2019 | Lim .................. H04L 27/2602 |
| 2019/0253127 A1 | 8/2019 | Kang et al. |
| 2019/0261287 A1 | 8/2019 | Deenoo et al. |
| 2019/0349960 A1* | 11/2019 | Li .................. H04L 1/1812 |
| 2020/0059285 A1 | 2/2020 | Zhang et al. |
| 2020/0076488 A1 | 3/2020 | Brunel |
| 2020/0212988 A1* | 7/2020 | Lim .................. H04B 7/0626 |
| 2020/0220583 A1 | 7/2020 | Cha et al. |
| 2021/0274503 A1* | 9/2021 | Farag .................. H04W 72/046 |
| 2022/0053433 A1* | 2/2022 | Abedini .................. H04W 74/0833 |
| 2022/0095372 A1* | 3/2022 | Cozzo .................. H04B 7/0695 |
| 2024/0049183 A1* | 2/2024 | Wang .................. H04L 5/0051 |
| 2024/0267987 A1* | 8/2024 | Babaei .................. H04W 76/28 |

FOREIGN PATENT DOCUMENTS

| | | |
|---|---|---|
| WO | 2018017840 A1 | 1/2018 |
| WO | 2018031065 A1 | 2/2018 |
| WO | 2018031875 A1 | 2/2018 |
| WO | 2018031924 A1 | 2/2018 |
| WO | 2018045092 A1 | 3/2018 |
| WO | 2018065662 A1 | 4/2018 |
| WO | WO-2018085144 A1 * | 5/2018 ............ H04W 24/08 |
| WO | 2018202081 A1 | 8/2018 |
| WO | 2018183991 A1 | 10/2018 |

OTHER PUBLICATIONS

Palacios, et al., "Tracking mm-Wave Channel Dynamics: Fast Beam Training Strategies under Mobility" IMDEA Networks Institute, Madrid, Spain, Universidad Carlos III de Madrid, Madrid, Spain. arXiv:1612.07957v1 [c,s.NI] Dec. 23, 2016.

Sur, et al., "BeamSpy: Enabling Robust 60 GHz Links Under Blockage" University of Wisconsin-Madison (2016).

Xue, et al., "Beam Management for Millimeter Wave Beamspace MU-MIMO Systems" arXiv:1710.03640v2 [c,s.NI] Sep. 30, 2018.

Yu, et al., "Beamforming on Mobile Devices: A First Study" Conference Paper—(Sep. 2011) DOI: 10.1145/2030613.2030643—Source: DBLP.

Non-Final Office Action received for U.S. Appl. No. 16/440,847, dated Aug. 18, 2020, 33 pages.

Final Office Action received for U.S. Appl. No. 16/440,847, dated Mar. 29, 2021, 44 pages.

Non-Final Office Action received for U.S. Appl. No. 16/440,847, dated Oct. 5, 2021, 60 pages.

Final Office Action received for U.S. Appl. No. 16/440,847, dated Feb. 25, 2022, 108 pages.

Notice of Allowance received for U.S. Appl. No. 16/440,847, dated Nov. 23, 2022, 11 pages.

\* cited by examiner

RECEIVER BEAMFORMING AND ANTENNA PANEL SWITCHING IN ADVANCED NETWORKS

CROSS-REFERENCE TO RELATED APPLICATIONS

This application is a continuation of, and claims priority to, U.S. patent application Ser. No. 16/440,847, filed Jun. 13, 2019, and entitled "RECEIVER BEAMFORMING AND ANTENNA PANEL SWITCHING IN ADVANCED NETWORKS," which applications claim the benefit of United States Provisional Application No. 62/738,683, filed Sep. 28, 2018, and entitled "RECEIVER BEAMFORMING AND ANTENNA PANEL SWITCHING IN ADVANCED NETWORKS," the entireties of which priority applications are expressly incorporated herein by reference.

TECHNICAL FIELD

This disclosure relates generally to the field of mobile communication and, more specifically, to receiver beam switching procedures in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G), or other next generation, standards for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
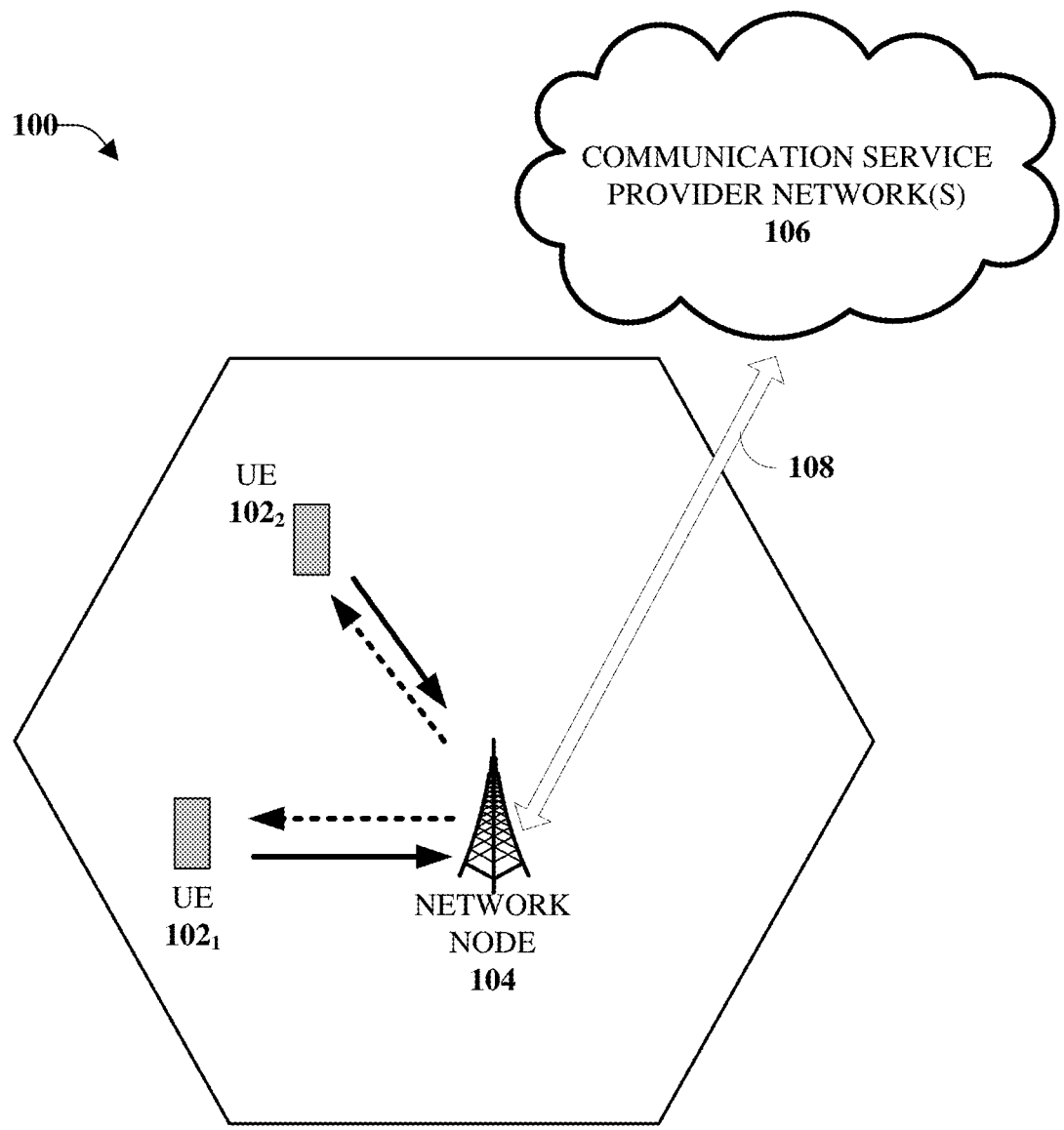
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate receiver beamforming and antenna panel switching in advanced networks. In one embodiment, described herein is a system that can comprise a processor and a memory that stores executable instructions that, when executed by the processor, facilitate performance of operations. The operations can comprise performing a receiver beam evaluation procedure that determines whether a receiving beam is to be changed from a first receiving beam to a second receiving beam. The operations can also comprise transmitting, to a network device, a request for permission to perform a beam management procedure that switches the receiving beam from the first receiving beam to the second receiving beam. Further, the operations can comprise receiving, from the network device, a response to the request. The response can comprise an indication of an action to be performed based on a result of the receiver beam evaluation procedure.

In an example, performing the receiver beam evaluation procedure can comprise decoding a signal received on a downlink shared channel and determining the receiving beam is to be changed from the first receiving beam to the second receiving beam. The determination to change the receiving beam can be based on a determination that a cyclic redundancy check for the signal received over the downlink shared channel has failed more than a defined threshold number of times.

In another example, performing the receiver beam evaluation procedure can comprise evaluating low-density parity-check code decoding iterations. Further, performing the receiver beam evaluation procedure can comprise determining the receiving beam is to be changed from the first receiving beam to the second receiving beam based on a result of the evaluating indicating that a number of iterations utilized for decoding a downlink shared channel satisfies a defined threshold number of iterations over a defined time interval.

In a further example, performing the receiver beam evaluation procedure can comprise using gyroscope data to determine an orientation of a mobile device.

According to an implementation, transmitting the request can comprise transmitting the request at a first available transmission opportunity via an uplink control channel. Further to this implementation, the operations can comprise using an unused combination of channel state information to indicate that the beam management procedure is to be started.

In some implementations, transmitting the request can comprise transmitting the request at a first available transmission opportunity using a reserved physical random access channel that corresponds to a contention-free random access channel resource.

Further, in some implementations, transmitting the request can comprise transmitting the request at a first available transmission opportunity by including the request in uplink control information in an uplink shared control channel.

In another example, transmitting the request can comprise transmitting the request via a channel configured to operate according to a fifth generation wireless network communication protocol.

In another embodiment, provided is a method that can comprise determining, by a mobile device of a communications network, that a receiving beam is to be changed from a first receiving beam to a second receiving beam based on a receiver beam training procedure. The mobile device can comprise a processor. The method can also comprise facilitating, by the mobile device, a transmission, to a network device, of a request for authorization to perform a beam management procedure at the mobile device. The beam management procedure switches the receiving beam from the first receiving beam to the second receiving beam or a third receiving beam. Further, the method can comprise receiving, by the mobile device and from the network device, a response to the request. The response can comprise an indication of an action to be performed based on a result of the beam management procedure.

In an example, the method can comprise performing the receiver beam training procedure. Performing the receiver beam training procedure can comprise decoding a signal received on a downlink shared channel and determining the receiving beam is to be changed from the first receiving beam to the second receiving beam based on a determination that a cyclic redundancy check for the signal received via the downlink shared channel has failed more than a defined threshold number of times.

In another example, the method can comprise performing the receiver beam training procedure. Performing the receiver beam training procedure can comprise evaluating low-density parity-check code decoding iterations and determining the receiving beam is to be changed from the first receiving beam to the second receiving beam based on a result of the evaluating indicating that a number of iterations utilized for decoding a downlink shared channel satisfies a defined threshold number of iterations over a defined time interval.

In an example, the method can comprise performing the receiver beam training procedure. Performing the receiver beam training procedure can comprise using gyroscope data to determine an orientation of a mobile device.

In some implementations, facilitating the transmission of the request can comprise transmitting the request at a first available transmission slot via an uplink control channel. In some implementations, the method can comprise using an unused combination of channel state information to indicate that the beam management procedure is to be started.

According to some implementations, facilitating the transmission of the request can comprise transmitting the request at a first available transmission slot using a reserved physical random access channel that corresponds to a contention-free random access channel resource. In some implementations, facilitating the transmission of the request can comprise transmitting the request at a first available transmission slot by including the request in uplink control information on an uplink shared control channel.

In another embodiment, provided is a method that can comprise receiving, by a network device of a communications network, a request, from a mobile device of the communications network, to initiate a receiving beam switching procedure at the mobile device, the network device comprising a processor. The method can also comprise sending, by the network device, an instruction to initiate the receiving beam switching procedure at the mobile device based on the request. Further, the method can comprise updating, by the network device, a transmission configuration indicator state represented in downlink control information.

In an example, sending the instruction can comprise triggering a beam management procedure that instructs the mobile device to report a reference signal received power for a first transmit beam and a second transmit beam.

In another example, the method can comprise, prior to updating the transmission configuration indicator state, receiving, by the network device, a selection of a transmission beam from the mobile device. Further to this example, the method can comprise transmitting, by the network device, a channel state information reference signal with repetition. The channel state information reference signal triggers a receiver beam training procedure at the mobile device.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or LTE, or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, 3GPP, LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Multiple Input, Multiple Output (MIMO) systems can significantly increase the data carrying capacity of wireless systems. For these reasons, MIMO is an integral part of the 3G and 4G wireless systems. 5G systems can also employ MIMO systems, also called massive MIMO systems (e.g., hundreds of antennas at the Transmitter side and/Receiver side). In an example of a $(N_t, N_r)$ system, where $N_t$ denotes the number of transmit antennas and $N_r$ denotes the receive antennas, and where N is an integer, the peak data rate multiplies with a factor of $N_t$ over single antenna systems in rich scattering environment.

Referring now to FIG. 1, illustrated is an example, non-limiting, wireless communication system 100 in accordance with one or more embodiments described herein. According to various embodiments, the wireless communication system 100 can comprise one or more User Equipment devices (UEs), illustrated as a first UE $102_1$ and a second UE $102_2$. It is noted that although only two UEs are illustrated for purposes of simplicity, the wireless communication system 100 can comprise a multitude of UEs.

The non-limiting term user equipment can refer to any type of device that can communicate with a network node in a cellular or mobile communication system. A UE can comprise one or more antenna panels having vertical and horizontal elements. UEs can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. Other examples of UEs comprise, but are not limited to, a target device, device to device (D2D), machine type UE or UE capable of machine to machine (M2M) communications, personal digital assistant (PDA), tablet, mobile terminals, laptop mounted equipment (LME), universal serial bus (USB) dongles enabled for mobile communications, a computer having mobile capabilities, a mobile device such as a cellular phone, a laptop having laptop embedded equipment (LEE), such as a mobile broadband adapter, a tablet computer having a mobile broadband adapter, and the like. User equipment (e.g., the first UE $102_1$, the second UE $102_2$) can also comprise Internet of Things (IoT) devices that can communicate wirelessly. UEs can roughly correspond to the mobile station (MS) in Global System for Mobile communications (GSM) systems.

In various embodiments, the wireless communication system 100 is, or can comprise, a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with the UEs, thus providing connectivity between the UEs and the wider cellular network. Further, the network node device 104 can facilitate wireless communication between the UEs and the wireless communication network (e.g., one or more communication service provider networks 106) via the network node device 104. In example embodiments, the UEs (e.g., the first UE $102_1$, the second UE $102_2$) can send and/or receive communication data via a wireless link to the network node device 104. The dashed arrow lines from the network node device 104 to the UEs (e.g., the first UE $102_1$, the second UE $102_2$) represent downlink (DL) communications and the solid arrow lines from the UE (e.g., the first UE $102_1$, the second UE $102_2$) to the network nodes (e.g., the network node device 104) represents uplink (UL) communications.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service networks, enterprise networks, cloud based networks, and the like.

The non-limiting term network node (e.g., network node device) can be used herein to refer to any type of network node serving one or more UEs and/or connected to other network nodes, network elements, other nodes, and/or other devices from which one or more UEs can receive a radio signal. In cellular radio access networks (e.g., UMTS networks), a network node can be referred to as Base Transceiver Stations (BTS), radio base station, radio network nodes, base stations, Node B, eNode B (e.g., evolved Node B), and so on. In 5G terminology, the node can be referred to as a gNode B (e.g., gNB) device.

Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can comprise but are not limited to: Node B devices, Base Station (BS) devices, Access Point (AP) devices, and Radio Access Network (RAN) devices. The network node device 104 can also comprise Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in distributed antenna system (DAS), and the like.

For example, in at least one implementation, the wireless communication system 100 can be, or can include, a large scale wireless communication network that spans various geographic areas. According to this implementation, the one or more communication service provider networks 106 can be, or can include, the wireless communication network and/or various additional devices and components of the wireless communication network (e.g., additional network devices and cell, additional UEs, network server devices, etc.).

The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UEs (e.g., the first UE $102_1$, the second UE $102_2$) and the network node device 104. While example embodiments might be described for 5G NR systems, the embodiments can be applicable to any Radio Access Technology (RAT) or multi-RAT system where the UE operates using multiple carriers e.g. LTE FDD/TDD, GSM/GERAN, CDMA2000, and so on.

For example, the wireless communication system 100 can operate in accordance with GSM, UMTS, LTE, LTE frequency division duplexing (LTE FDD), LTE Time Division Duplexing (TDD), HSPA, CDMA, Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), Discrete Fourier Transform Spread OFDM (DFT-spread OFDM) Single Carrier FDMA (SC-FDMA), Filter Bank Based Multi-Carrier (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), Unique Word OFDM (UW-OFDM), Unique Word DFT-spread OFDM (UW DFT-Spread-OFDM), Cyclic Prefix OFDM CP-OFDM, resource-block-filtered OFDM, WiFi, WLAN, WiMax, and the like.

Various features and functionalities of the wireless communication system 100 are particularly described wherein the devices (e.g., the UEs (e.g., the first UE $102_1$, the second UE $102_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as MTCs.

Figure 2:
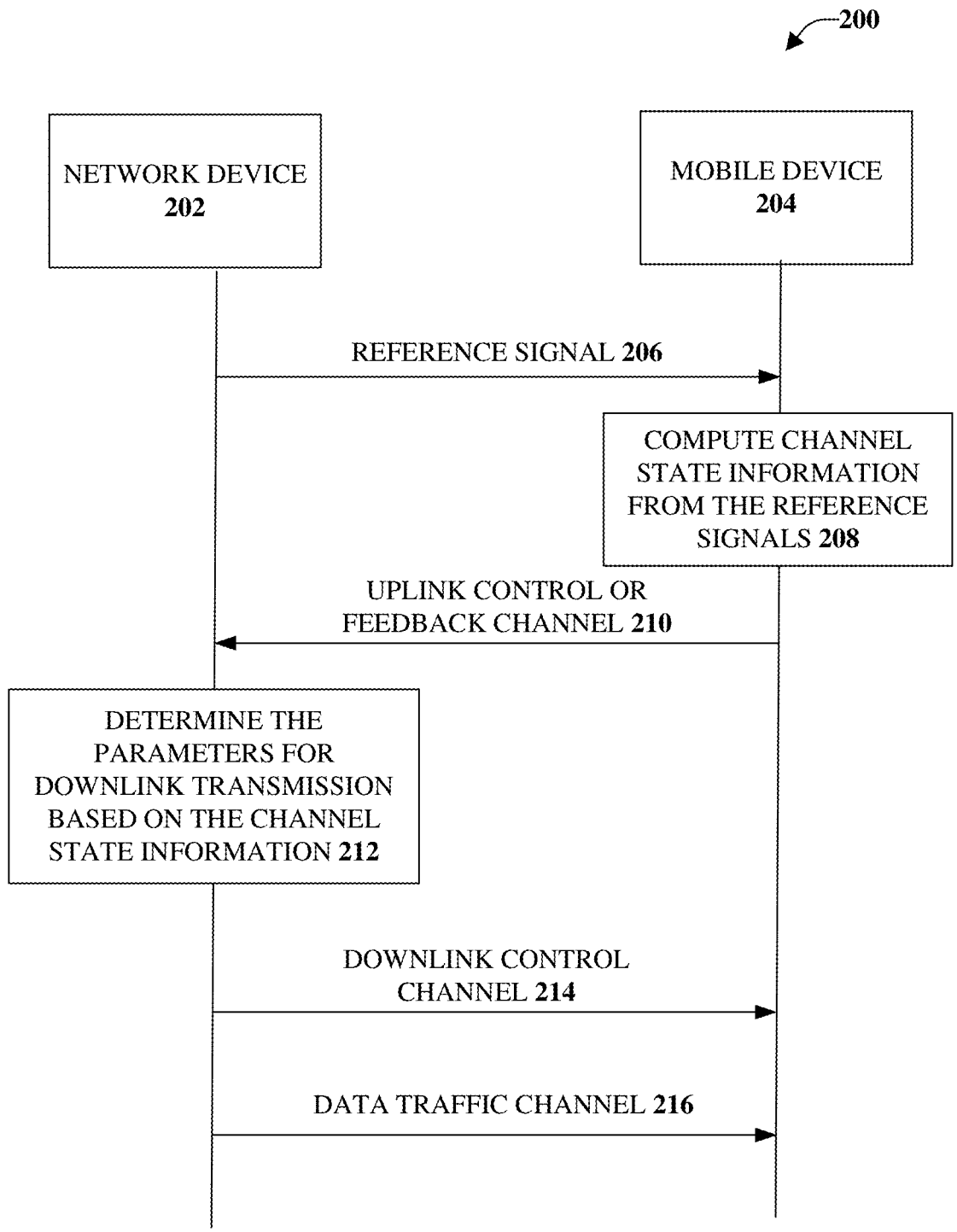
FIG. 2 illustrates an example, non-limiting, message sequence flow chart that can facilitate downlink data transfer in accordance with one or more embodiments described herein.

Referring now to FIG. 2, illustrated is an example, non-limiting, message sequence flow chart 200 that can facilitate downlink data transfer in accordance with one or more embodiments described herein. The message sequence flow chart 200 can be utilized for new radio, as discussed herein. As illustrated, the message sequence flow chart 200 represents the message sequence between a network device 202 (e.g., a gNB) and a mobile device 204. As used herein, the term "network device 202" can be interchangeable with (or can include) a network, a network controller or any number of other network components. One or more pilot signals and/or reference signals 206 can be transmitted from the network device 202 to the mobile device 204. The one or more pilot signals and/or reference signals 206 can be cell specific and/or user equipment specific signals. The one or more pilot signals and/or reference signals 206 can be beamformed or non-beamformed.

Based on the one or more pilot signals and/or reference signals 206, the mobile device 204 can compute the channel estimates and can compute the one or more parameters needed for Channel State Information (CSI) reporting, as indicated at 208. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 204 to the network device 202 via a feedback channel (e.g., an uplink control or feedback channel 210). The CSI report can be sent based on a request from the network device 202, a-periodically, and/or the mobile device 204 can be configured to report periodically or at another interval.

The network device 202, which can comprise a scheduler (e.g., a scheduler component), can use the CSI report for choosing the parameters for scheduling of the mobile device 204 (e.g., a particular mobile device). For example, as indicated at 212, the network device 202 can choose the parameters for downlink transmission based on the channel state information. The parameters for downlink transmission can include, but are not limited to: Modulation and Coding Scheme (MCS), power, Physical Resource Blocks (PRBs), and so on.

The network device 202 can send the scheduling parameters to the mobile device 204 via a downlink control channel (e.g., a downlink control channel 214). Upon or after the scheduling parameter information is transmitted, the actual data transfer can take place from the network device 202 to the mobile device 204 over a data traffic channel (e.g., data traffic channel 216).

Downlink reference signals are predefined signals occupying specific resource elements within the downlink time—frequency grid. There are several types of downlink reference signals that are transmitted in different ways and used for different purposes by the receiving terminal (e.g., the mobile device 204). For example, downlink reference signals can include CSI reference signals (CSI-RS) and/or demodulation reference signals (DM-RS).

CSI reference signals are specifically intended to be used by terminals (e.g., the mobile device 204) to acquire channel-state information (CSI) and beam specific information (beam RSRP). In 5G, for example, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | | PMI-FormatIndicator = subbandPMI or CQI-FormatIndicator = subbandCQI | |
| --- | --- | --- | --- |
| | CSI Part I | CSI Part II | |
| | | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields X₂ of all even subbands |
| Layer Indicator | Layer Indicator | — | Subband differential CQI for the second TB of all odd subbands |
| PMI wideband (X1 and X2) | Wideband CQI | — | PMI subband information fields X₂ of all odd subbands |
| Wideband CQI | Subband differential CQI for the first TB | — | — |

It is noted that for NR, the subband can be defined according to the bandwidth part of the Orthogonal Frequency-Division Multiplexing (OFDM) in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
| --- | --- |
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port (s), transmission configuration indication, Sounding Reference Signal (SRS) request, Code Block Group (CBG) transmission information, CBG flushing out information, Demodulation Reference Signal (DMRS) sequence initialization, and so on.

Figure 3:
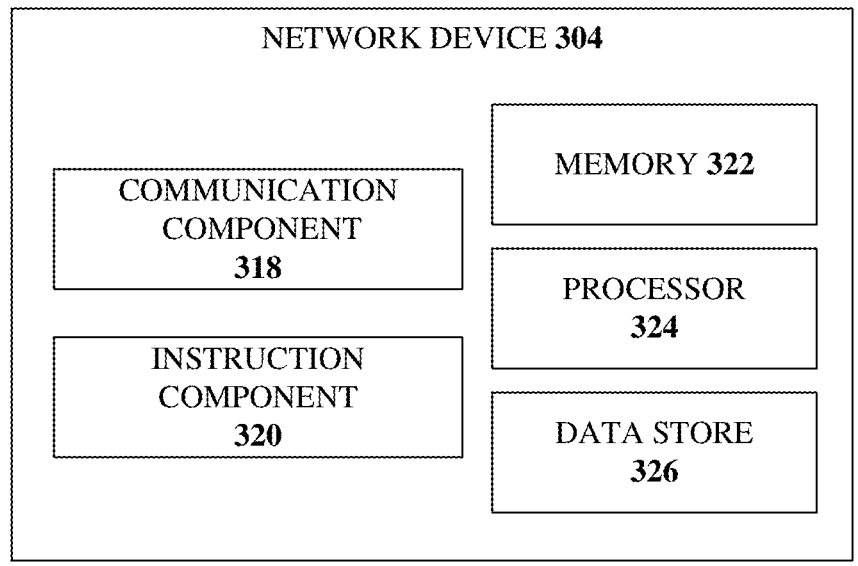
FIG. 3 illustrates an example, non-limiting, communications system for receiver beamforming and antenna panel switching in advanced networks in accordance with one or more embodiments described herein.
Figure 3:
Figure 3:
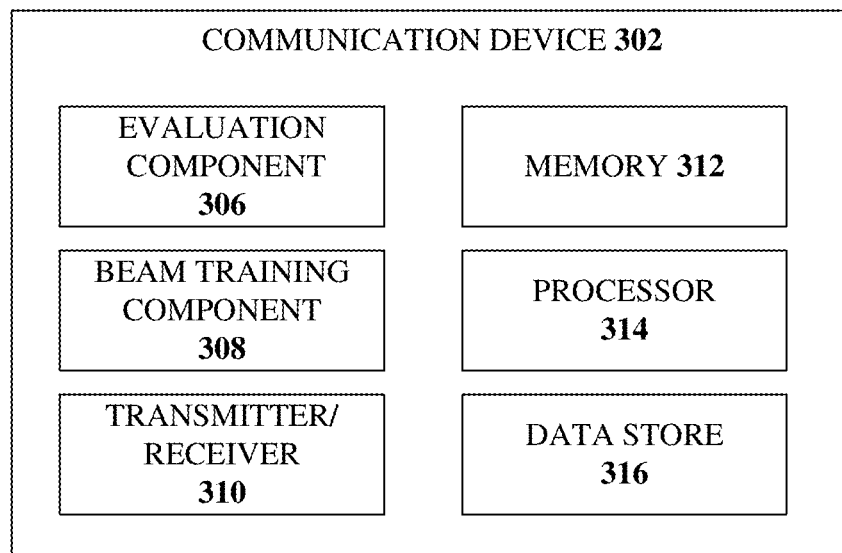

FIG. 3 illustrates an example, non-limiting, communications system 300 for receiver beamforming and antenna panel switching in advanced networks in accordance with one or more embodiments described herein. The various aspects discussed herein can allow a communication device 302 (e.g., a mobile device, a user equipment (UE) and the like) to use its own implementation to determine whether switching a receiver beam or antenna panel is needed. If needed, the communication device 302 can request a network device 304 to allow the communication device 302 to redo the beam management procedure. Redoing the beam management procedure allows the communication device 302 to update the previously reported beam management Reference Signal Received Power (RSRP). Further, redoing the beam management procedure allows the communication device 302 to refresh a receiver beam selection. The procedure is an on-demand based procedure. Therefore, the procedure can effectively reduce the Reference Signal (RS) overhead needed for periodic transmission of beam management RSs.

In further detail, during the channel measurement campaign, one of the mm Wave propagation characteristic is the so called blockage effect. As a result of a smaller wave length, objects around the user, including the user himself/herself (e.g., the user's hand), might block the mm wave propagation on a certain direction, at least temporarily. The narrower beamforming of NR also makes this effect more obvious.

In order to overcome the blockage effect, especially to reduce the user self-blockage, receiver beamforming technology has been adopted. The basic principle is to switch the receiver antenna weighting factors to adjust the effective receiving angle. By using that, the UE can adaptively find the propagation path which is blocked and then adapt to a separate one (e.g., a different propagation path).

For example, take a massive MIMO system that comprises a number of antenna elements that is equal to N. However, the network uses Np ports (Np=2 or 4 or 8 or 16 or 24). In this case, the signals transmitted from N elements can be virtualized from the Np antenna ports. Hence the received signals for the $i^{th}$ subcarrier can be written as $$Y=HFWx+n$$

where H is the channel matrix between the transmitter antenna elements dimensions ($N_r \times N$), F is the analog beamforming matrix of dimensions ($N \times N_p$), W is the digital precoding matrix of dimensions ($N_p \times R$), x is the transmitted signal vector of size ($R \times 1$), and R is the transmission rank of the system.

After applying the receiver beam forming the received signal is $$Z=G(HFWx+n)$$

where G is the receiver beamforming matrix.

In order to help the UE identify the receiving signal quality from different receiver beams, the NR specification has adopted a receiver beam training procedure, which is referred to as Channel State Information Reference Signal (CSI-RS) transmission with repetition "ON." The basic concept is to repeat CSI-RS transmission from the same Tx beam for multiple times so the UE receiver can sweep its receiver beam to find the best one. In general, the network sends periodically CSI-RS, which facilitates the UE to identify the receiver beam.

A special type of receiver beam switching is antenna panel switching. Due to the small size of antennas in mmWave, many UEs will be equipped with two or more antenna panels (e.g. one at the front and one at the back). Switching the antenna panel can have a similar effect as switching beam, and because the front and back panel are facing at different direction, this design can effectively reduce the blockage effect cause by users himself/herself (e.g. the user's hand holding the UE). However, the required processing time is very different, as switching antenna panel may require turning the RF from off to on. In the current NR specification, there is no standard defined procedure to support antenna panel switching procedure.

As mentioned, the NR specification has adopted a receiver beam training procedure which is called CSI-RS transmission with repetition "ON." The basic concept is to repeat CSI-RS transmission for multiple times so the UE receiver can sweep its receiver beam to find the best one. However, that procedure is of high overhead thus it can only be triggered by network when needed. The problem related to this procedure is that the network has no information related to when a receiver beam training procedure needs to be triggered. As a result, the network often will trigger a receiver beam training procedure periodically, which can incur a large amount of overhead.

As illustrated in FIG. 3, the communications system 300 can include the communication device 302 and the network device 304. The network device 304 can be included in a group of network devices of a wireless network. Although only a single communication device and a single network device are shown and described, the various aspects are not limited to this implementation. Instead, multiple communication devices and/or multiple network devices can be included in a communications system.

The communication device 302 can include an evaluation component 306, a beam training component 308, a transmitter/receiver 310, at least one memory 312, at least one processor 314, and at least one data store 316. The network device 304 can include a communication component 318, an instruction component 320, at least one memory 322, at least one processor 324, and at least one data store 326.

The evaluation component 306 can be configured to identify whether there is a better receiving beam than the current receiving beam being utilized by the communication device 302. The identification procedure is a UE implementation (e.g., implemented by the communication device 302). Therefore, the identification procedure can be transparent to NR standards or other standards (e.g., the UE can be configured based on manufacturer specification or specifications of another entity that configures the UE).

According to an implementation, the communication device 302 (e.g., the evaluation component 306) can decode a downlink shared channel (e.g., a Physical Downlink Shared Channel (PDSCH)) and observe whether a Cyclic Redundancy Check (CRC) has failed over multiple instances (e.g., has failed more than a defined threshold number of times, has not executed successfully more often than not, has not executed successfully the majority of the time).

In accordance with another implementation, the communication device 302 (e.g., the evaluation component 306) can observe the Low-Density Parity-Check Code (LDPC) decoding iteration and determine whether the number of iterations required for decoding the PDSCH is very large over a period of time (e.g., a defined time interval) or not. If the number of iterations is very large (e.g., satisfies a defined threshold number of iterations over a defined time interval), the evaluation component 306 can interpret this as indicating that the receiver beam might not be optimal and, therefore, might require a change to the receiver beam.

According to some implementations, the communication device 302 (e.g., the evaluation component 306) can estimate the RSRP from RSs with a same Transmission Configuration Indicator (TCI) state with one or more different receiver beams with a different receiver beam. By comparing the RSRP from one or more different receiver beams, the communication device 302 can determine whether receiver beam switching should be performed. As a non-limiting example, the communication device 302 can receive (e.g., via the transmitter/receiver 310) multiple Channel State Information Reference Signal (CSI-RS) transmission (with same TCI state) using a different receiver beam. In another example, the communication device 302 can receive (e.g., via the transmitter/receiver 310) Demodulation Reference Signals (DMRS) and CSI-RS (with same TCI states) using different receiver beams.

In accordance with another implementation, the communication device 302 can turn on a second antenna panel and the evaluation component 306 can detect the receiver signaling quality on CSI-RS or DMRS and determine whether a receiver beam training is needed.

According to a further implementation, the communication device 302 can comprise a front side panel (e.g., antenna panel) and a back side panel (e.g., antenna panel), corresponding to the different sides (e.g., the front and the back) of the communication device 302. Because the antenna signal might not be able to penetrate through the communication device 302, the antenna should be switched (e.g., from a front side antenna panel to a back side antenna panel, or vice versa). Thus, the evaluation component 306 can using gyroscope data to determine an orientation of a mobile device. In an example, the evaluation component 306 can determine that that communication device 302 has been flipped over (such as on a table) or transitioned between a front facing orientation and a back facing orientation.

Upon or after the evaluation component 306 determines there is a need to perform receiving beam training, the transmitter/receiver 310 can send to the network (e.g., the network device 304) a request to re-do the beam management procedure. The request signaling can be transmitted by the transmitter/receiver 310 at the first available transmission opportunity through various channels.

According to an implementation, the request can be sent in a particular state (or a defined state) in the Physical Uplink Control Channel (PUCCH). For example, an unused combination of CSI can be used to indicate to the network (e.g., the network device 304) that the communication device 302 requests that the network to start the beam management procedure.

In accordance with another implementation, the request signaling can be transmitted by the transmitter/receiver 310 at the first available transmission opportunity through a reserved Physical Random Access Channel (PRACH) state corresponding to a contention-free RACH resource. According to another implementation, the request signaling can be transmitted by the transmitter/receiver 310 at the first available transmission opportunity by piggybacking (e.g., including the request in) Uplink Control Information (UCI) in an uplink shared control channel (e.g., a Physical Uplink Shared Channel (PUSCH)).

Upon or after receiving the request (e.g., via the communication component 318) at the network device 304, the instruction component 320 can trigger a beam management procedure for the communication device 302 to report the RSRP for different transmit (Tx) beams. According to another implementation, based on the selected best Tx beam, the network (e.g., the network device 304 via the instruction component 320) can trigger a receiver beam training procedure by transmitting (e.g., via the communication component 318) a CSI-RS with repetition (e.g., with repetition on or activated). In accordance with some implementations, based on the beam management procedure, TCI states might be updated in the Downlink Control Information (DCI).

Upon or after receiving the instruction from the network device 304 (e.g., via the transmitter/receiver 310), the beam training component 308 can implement (or redo) the beam management procedure as well as the receiver beam training procedure.

The transmitter/receiver 310 (and/or the communication component 318) can be configured to transmit to, and/or receive data from, the network device 304 (or the communication device 302), other network devices, and/or other communication devices. Through the transmitter/receiver 310 (and/or the communication component 318), the communication device 302 (and/or the network device 304) can concurrently transmit and receive data, can transmit and receive data at different times, or combinations thereof. According to some implementations, the transmitter/receiver 310 (and/or the communication component 318) can facilitate communications between an identified entity associated with the communication device 302 (e.g., an owner of the communication device 302, a user of the communication device 302, and so on). Further, the transmitter/receiver 310 (and/or the communication component 318) can be configured to receive, from the network device 304 or other network devices, multimedia content.

The at least one memory 312 can be operatively connected to the at least one processor 314. Further, the at least one memory 322 can be operatively connected to the at least one processor 324. The memories (e.g., the at least one memory 312, the at least one memory 322) can store executable instructions that, when executed by the processors (e.g., the at least one processor 314, the at least one processor 324) can facilitate performance of operations. Further, the processors can be utilized to execute computer executable components stored in the memories.

For example, the memories can store protocols associated with receiver beamforming and antenna panel switching as discussed herein. Further, the memories can facilitate action to control communication between the communication device 302 and the network device 304 such that the communications system 300 can employ stored protocols and/or algorithms to achieve improved communications in a wireless network as described herein.

The memories can store respective protocols associated with receiver beamforming and antenna panel switching, taking action to control communication between the communication device 302 and the network device 304, such that the communications system 300 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to receiver beamforming and antenna panel switching in a communication network. The processors can be processors dedicated to analyzing and/or generating information received, a processor that controls one or more components of the communications system 300, and/or a processor that both analyzes and generates information received and controls one or more components of the communications system 300.

Figure 4:
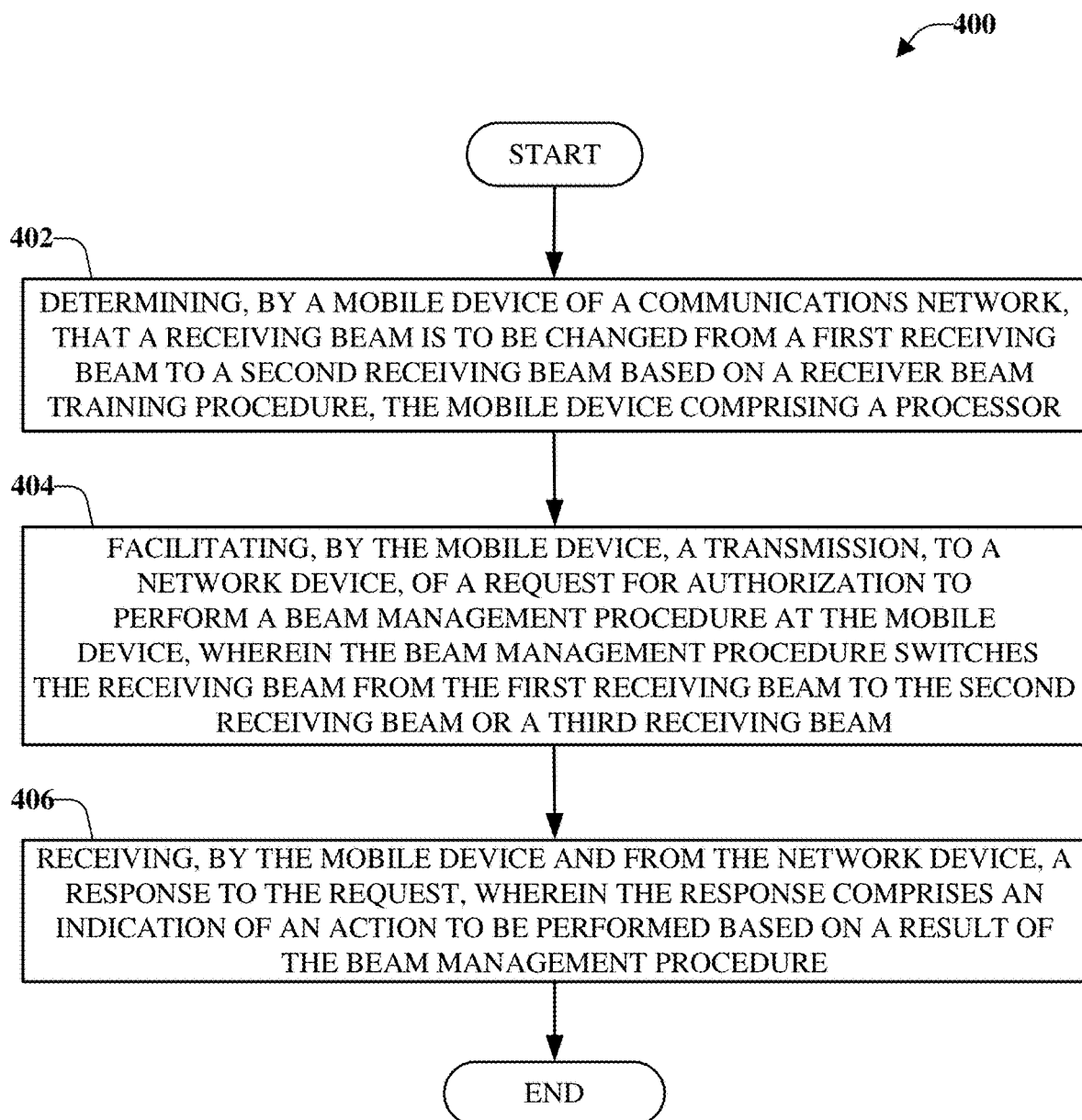
FIG. 4 illustrates an example, non-limiting, method for an on-demand receiver beam training procedure in accordance with one or more embodiments described herein.

FIG. 4 illustrates an example, non-limiting, method 400 for an on-demand receiver beam training procedure in accordance with one or more embodiments described herein. Repetitive description of like elements employed in other embodiments described herein is omitted for sake of brevity.

The method 400 can be implemented by a UE (e.g., the communication device 302) of a wireless network, the UE comprising a processor. Alternatively, or additionally, a machine-readable storage medium can comprise executable instructions that, when executed by a processor, facilitate performance of operations for the method 400.

The method 400 starts, at 402, when it is determined that a receiving beam is to be changed from a first receiving beam to a second receiving beam based on a receiver beam training procedure (e.g., via the evaluation component 306). For example, during the receiving beam identification procedures, a determination can be made whether utilization of a first receiving beam should be replaced with a second receiving beam. The determination can indicate that there is a better receiving beam (e.g., the second receiving beam) than the receiving beam (e.g., the first receiving beam) currently being utilized. The identification procedure (e.g., the determination at 402) can be a UE implementation and, therefore, can be transparent to the NR standard.

At 404, a transmission to a network device (e.g., the network device 304) can be facilitated (e.g., via the transmitter/receiver 310). The transmission can be included a request for authorization to perform a beam management procedure at the mobile device. The beam management procedure can be configured to switch the receiving beam from the first receiving beam to the second receiving beam, a third (or subsequent) receiving beam (e.g., a beam determined to be better than a current used beam).

Further, at 406, a response to the request can be received (e.g., via the transmitter/receiver 310). In an example, the response can comprise an indication of an action to be performed based on a result of the beam management procedure. The action can be to trigger a beam management procedure and for the mobile device to report the RSRP for different Tx beams. In another example, the action can be to trigger a receiver beam training procedure based on receipt of a CSI-RS with repletion on, which was transmitted by the network device. In another example, the action can be to update TCI states in the DCI.

Figure 5:
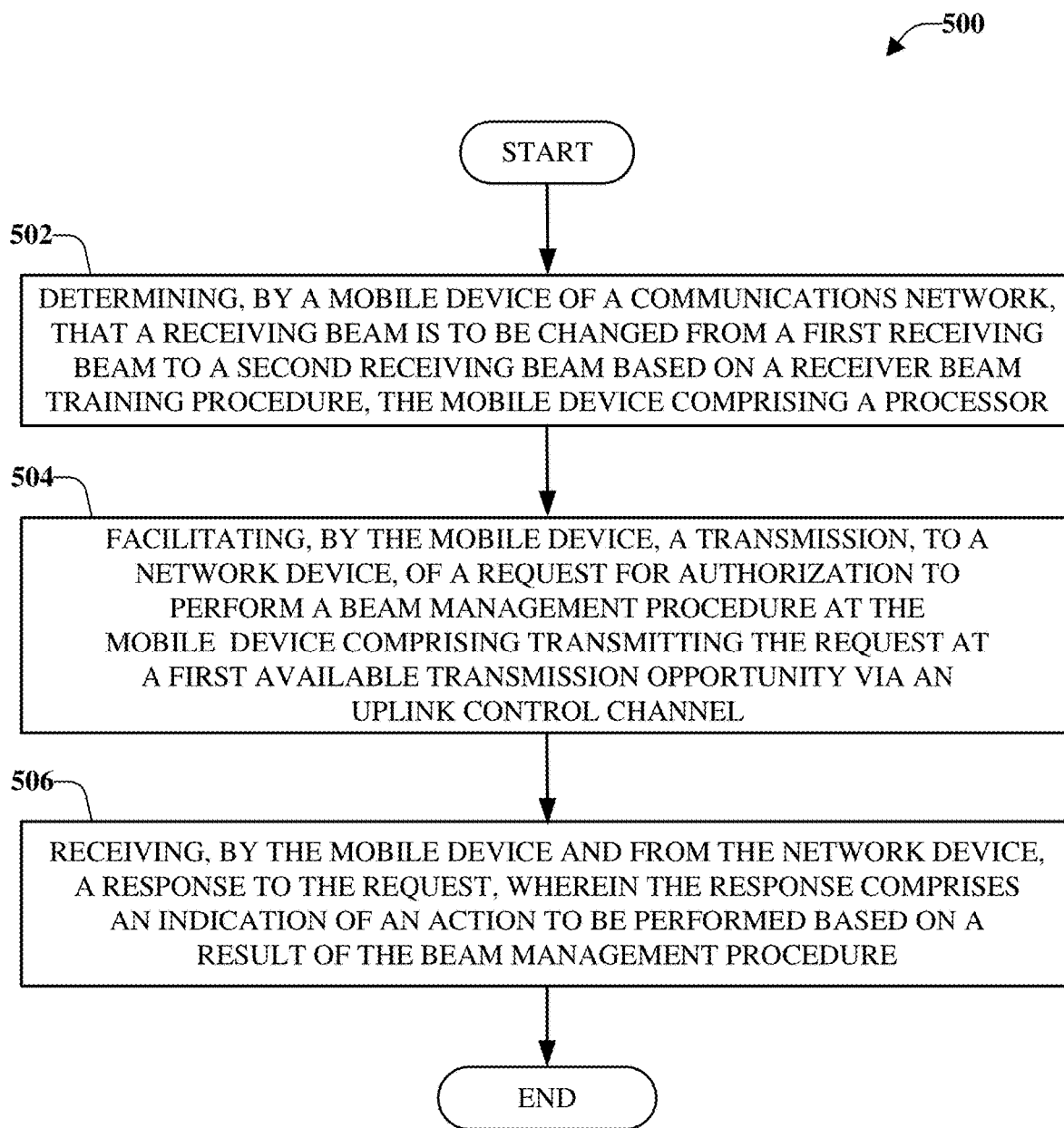
FIG. 5 illustrates an example, non-limiting, method for transmitting a request to a network device for performance of a beam management procedure at a mobile device in accordance with one or more embodiments described herein.

FIG. 5 illustrates an example, non-limiting, method 500 for transmitting a request to a network device for performance of a beam management procedure at a mobile device in accordance with one or more embodiments described herein. Repetitive description of like elements employed in other embodiments described herein is omitted for sake of brevity.

The method 500 can be implemented by a UE (e.g., the communication device 302) of a wireless network, the UE comprising a processor. Alternatively, or additionally, a machine-readable storage medium can comprise executable instructions that, when executed by a processor, facilitate performance of operations for the method 500.

At 502, a determination can be made that a receiving beam is to be changed from a first receiving beam to a second receiving beam based on a receiver beam training procedure (e.g., via the evaluation component 306). For example, during the receiving beam identification procedures, a determination can be made whether utilization of a first receiving beam should be replaced with a second receiving beam. The determination can indicate that there is a better receiving beam (e.g., the second receiving beam) than the receiving beam (e.g., the first receiving beam) currently being utilized. The identification procedure (e.g., the determination at 502) can be a UE implementation and, therefore, can be transparent to the NR standard.

At 504, a transmission of a request for permission to perform a beam management procedure that switches the receiving beam from the first receiving beam to the second receiving beam can be sent to a network device (e.g., via the transmitter/receiver 310). Transmitting the request can comprise transmitting the request at a first available transmission opportunity as a defined state via an uplink control channel. For example, transmitting the request can comprise using an unused combination of channel state information to indicate that the beam management procedure is to be started.

Further, at 506, a response to the request can be received from the network device (e.g., via the transmitter/receiver 310). In an example, the response can comprise an indication of an action to be performed based on a result of the beam management procedure. The action can be to trigger a beam management procedure and for the mobile device to report the RSRP for different Tx beams. In another example, the action can be to trigger a receiver beam training procedure based on receipt of a CSI-RS with repletion on, which was transmitted by the network device. In another example, the action can be to update TCI states in the DCI.

Figure 6:
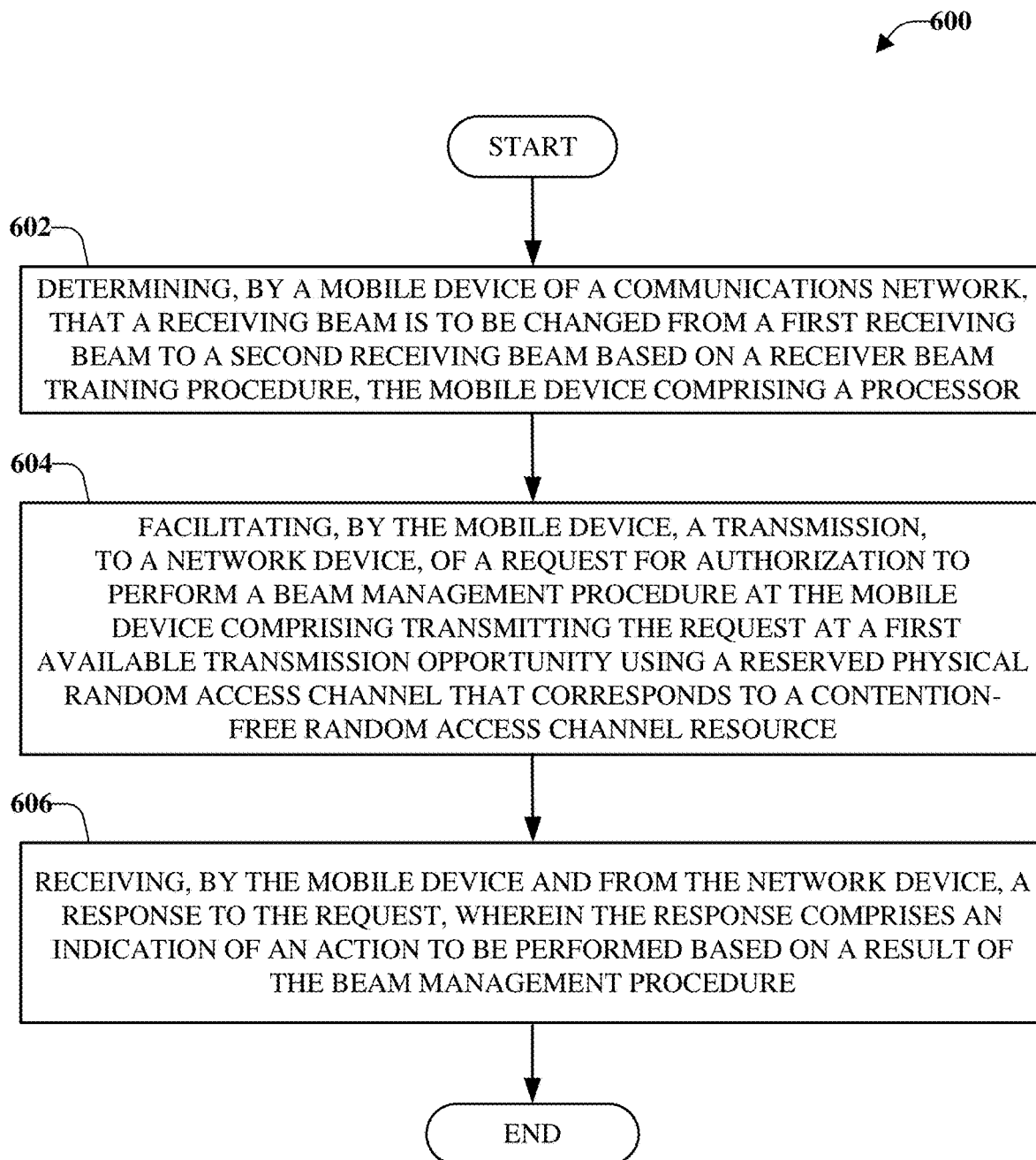
FIG. 6 illustrates another example, non-limiting, method for transmitting a request to a network device for performance of a beam management procedure at a mobile device in accordance with one or more embodiments described herein.

FIG. 6 illustrates another example, non-limiting, method 600 for transmitting a request to a network device for performance of a beam management procedure at a mobile device in accordance with one or more embodiments described herein. Repetitive description of like elements employed in other embodiments described herein is omitted for sake of brevity.

The method 600 can be implemented by a UE (e.g., the communication device 302) of a wireless network, the UE comprising a processor. Alternatively, or additionally, a machine-readable storage medium can comprise executable instructions that, when executed by a processor, facilitate performance of operations for the method.

At 602, a determination can be made that a receiving beam is to be changed from a first receiving beam to a second receiving beam based on a receiver beam training procedure (e.g., via the evaluation component 306). For example, during the receiving beam identification procedures, a determination can be made whether utilization of a first receiving beam should be replaced with a second receiving beam. The determination can indicate that there is a better receiving beam (e.g., the second receiving beam) than the receiving beam (e.g., the first receiving beam) currently being utilized. The identification procedure (e.g., the determination at 602) can be a UE implementation and, therefore, can be transparent to the NR standard.

At 604, a transmission of a request to a request for permission to perform a beam management procedure that switches the receiving beam from the first receiving beam to the second receiving beam to a network device (e.g., the network device 304) can be facilitated (e.g., via the transmitter/receiver 310). Transmitting the request can comprise transmitting the request at a first available transmission opportunity using a reserved physical random access channel that corresponds to a contention-free random access channel resource.

Further, at 606, a response to the request can be received from the network device (e.g., via the transmitter/receiver 310). In an example, the response can comprise an indication of an action to be performed based on a result of the beam management procedure. The action can be to trigger a beam management procedure and for the mobile device to report the RSRP for different Tx beams. In another example, the action can be to trigger a receiver beam training procedure based on receipt of a CSI-RS with repletion on, which was transmitted by the network device. In another example, the action can be to update TCI states in the DCI.

Figure 7:
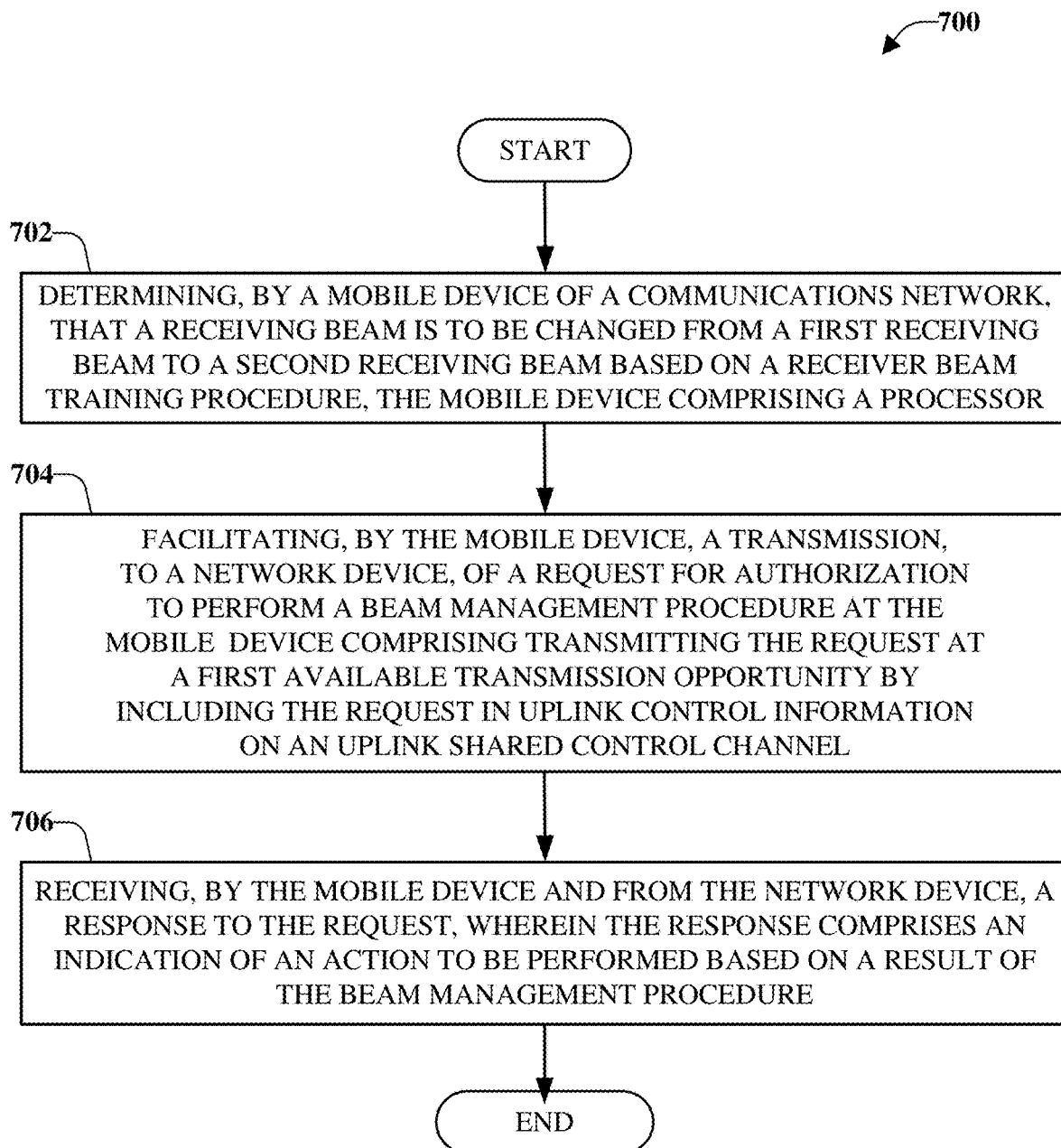
FIG. 7 illustrates a further example, non-limiting, method for transmitting a request to a network device for performance of a beam management procedure at a mobile device in accordance with one or more embodiments described herein.

FIG. 7 illustrates a further example, non-limiting, method 700 for transmitting a request to a network device for performance of a beam management procedure at a mobile device in accordance with one or more embodiments described herein. Repetitive description of like elements employed in other embodiments described herein is omitted for sake of brevity.

The method 700 can be implemented by a UE (e.g., the communication device 302) of a wireless network, the UE comprising a processor. Alternatively, or additionally, a machine-readable storage medium can comprise executable instructions that, when executed by a processor, facilitate performance of operations for the method 700.

At 702, a determination can be made that a receiving beam is to be changed from a first receiving beam to a second receiving beam based on a receiver beam training procedure (e.g., via the beam training component 308). For example, during the receiving beam identification procedures, a determination can be made whether utilization of a first receiving beam should be replaced with a second receiving beam. The determination can indicate that there is a better receiving beam (e.g., the second receiving beam) than the receiving beam (e.g., the first receiving beam) currently being utilized. The identification procedure (e.g., the determination at 502) can be a UE implementation and, therefore, can be transparent to the NR standard.

At 704, a transmission of a request to a request for permission to perform a beam management procedure that switches the receiving beam from the first receiving beam to the second receiving beam to a network device (e.g., the network device 304) can be facilitated (e.g., via the transmitter/receiver 310). Transmitting the request can comprise transmitting the request at a first available transmission opportunity by including the request in uplink control information on an uplink shared control channel.

Further, at 706, a response to the request can be received from the network (e.g., the network device 304) (e.g., via the transmitter/receiver 310). In an example, the response can comprise an indication of an action to be performed based on a result of the beam management procedure. The action can be to trigger a beam management procedure and for the mobile device to report the RSRP for different Tx beams. In another example, the action can be to trigger a receiver beam training procedure based on receipt of a CSI-RS with repletion on, which was transmitted by the network device. In another example, the action can be to update TCI states in the DCI.

Figure 8:
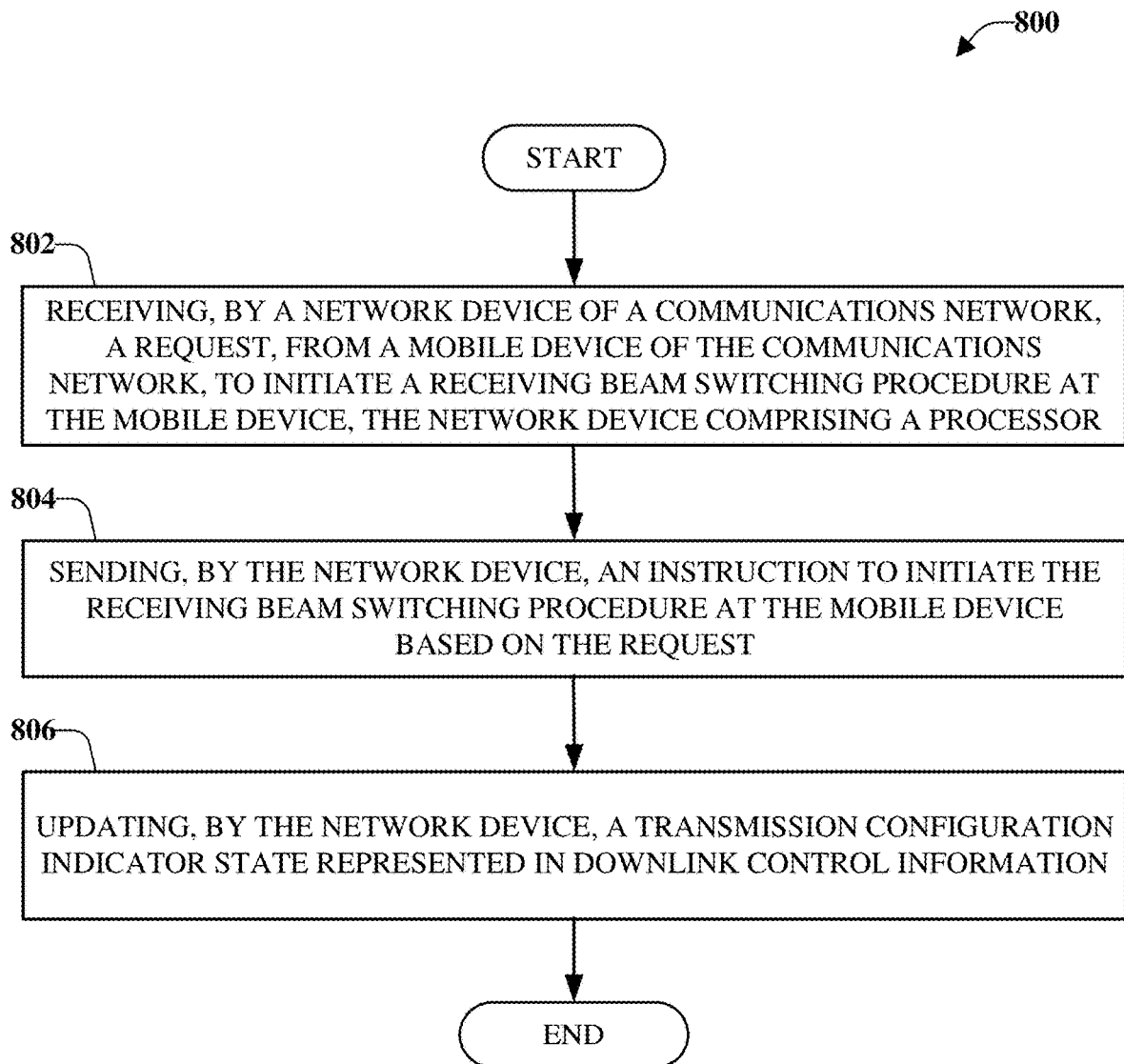
FIG. 8 illustrates an example, non-limiting, method for instructing a mobile device to perform a beam management procedure in accordance with one or more embodiments described herein.

FIG. 8 illustrates an example, non-limiting, method 800 for instructing a mobile device to perform a beam management procedure in accordance with one or more embodiments described herein. Repetitive description of like elements employed in other embodiments described herein is omitted for sake of brevity.

The method 800 can be implemented by a network device (e.g., the network device 304) of a wireless network, the network device comprising a processor. Alternatively, or additionally, a machine-readable storage medium can comprise executable instructions that, when executed by a processor, facilitate performance of operations for the method 800.

At 802, a request, can be received from a mobile device of the communications network (e.g., via the communication component 318). The request can be to initiate a receiving beam switching procedure at the mobile device.

At 804, an instruction can be sent, to the mobile device, to initiate the receiving beam switching procedure at the mobile device based on the request (e.g., via the instruction component 320). For example, sending the instruction can include triggering a beam management procedure that instructs the mobile device to report a reference signal received power for a first transmit beam and a second transmit beam. Further, at 806, an updated transmission configuration indicator state can be represented in downlink control information (e.g., via the communication component 318).

According to some implementations, prior to updating the transmission configuration indicator state, the method can include receiving, by the network device, a selection of a transmission beam from the mobile device. Further to these implementations, the method can include transmitting, by the network device, a channel state information reference signal with repetition. The channel state information reference signal can trigger the receiver beam training procedure at the mobile device.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Described herein are systems, methods, articles of manufacture, and other embodiments or implementations that can facilitate channel state information determination using demodulation reference signals in advanced networks. Facilitating channel state information determination using demodulation reference signals in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
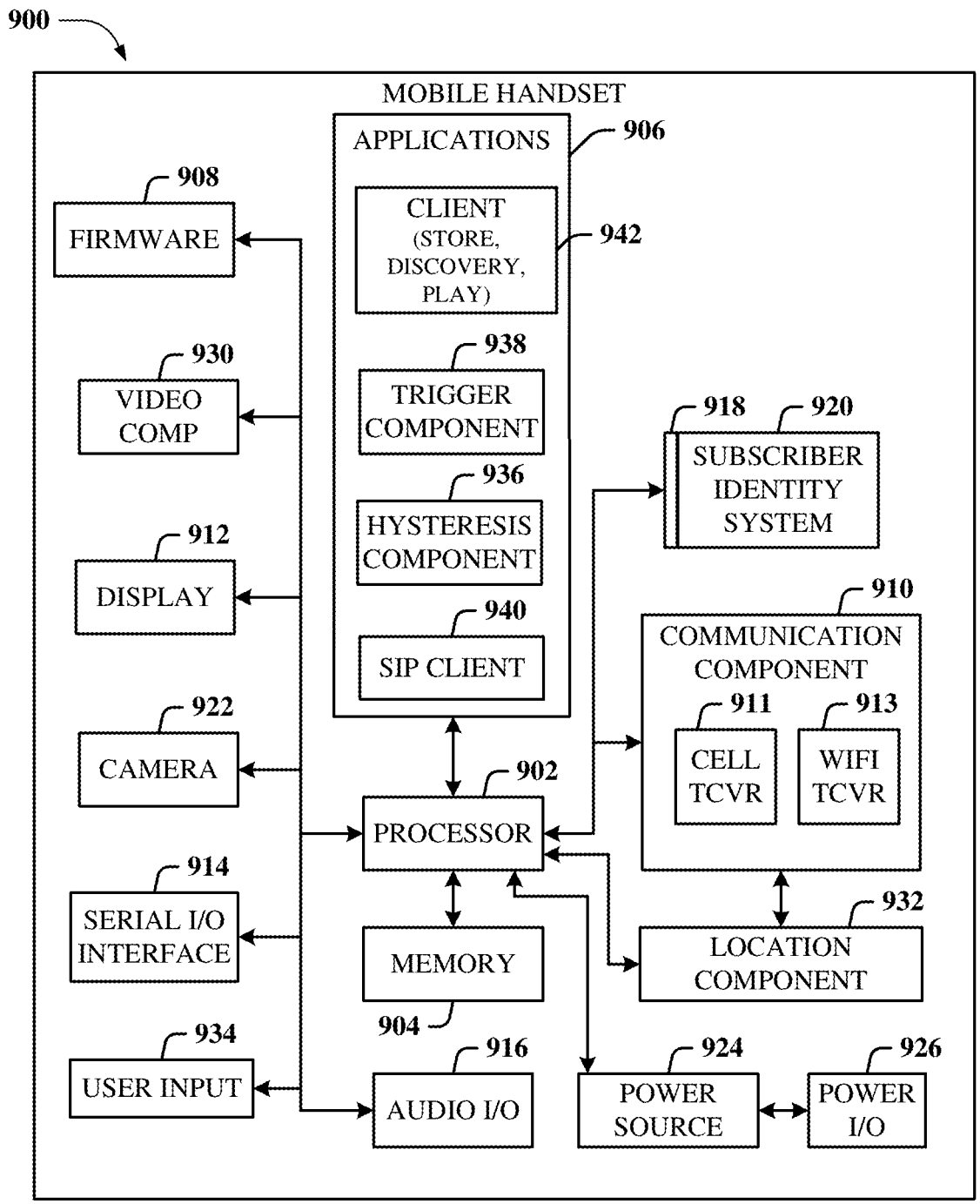
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
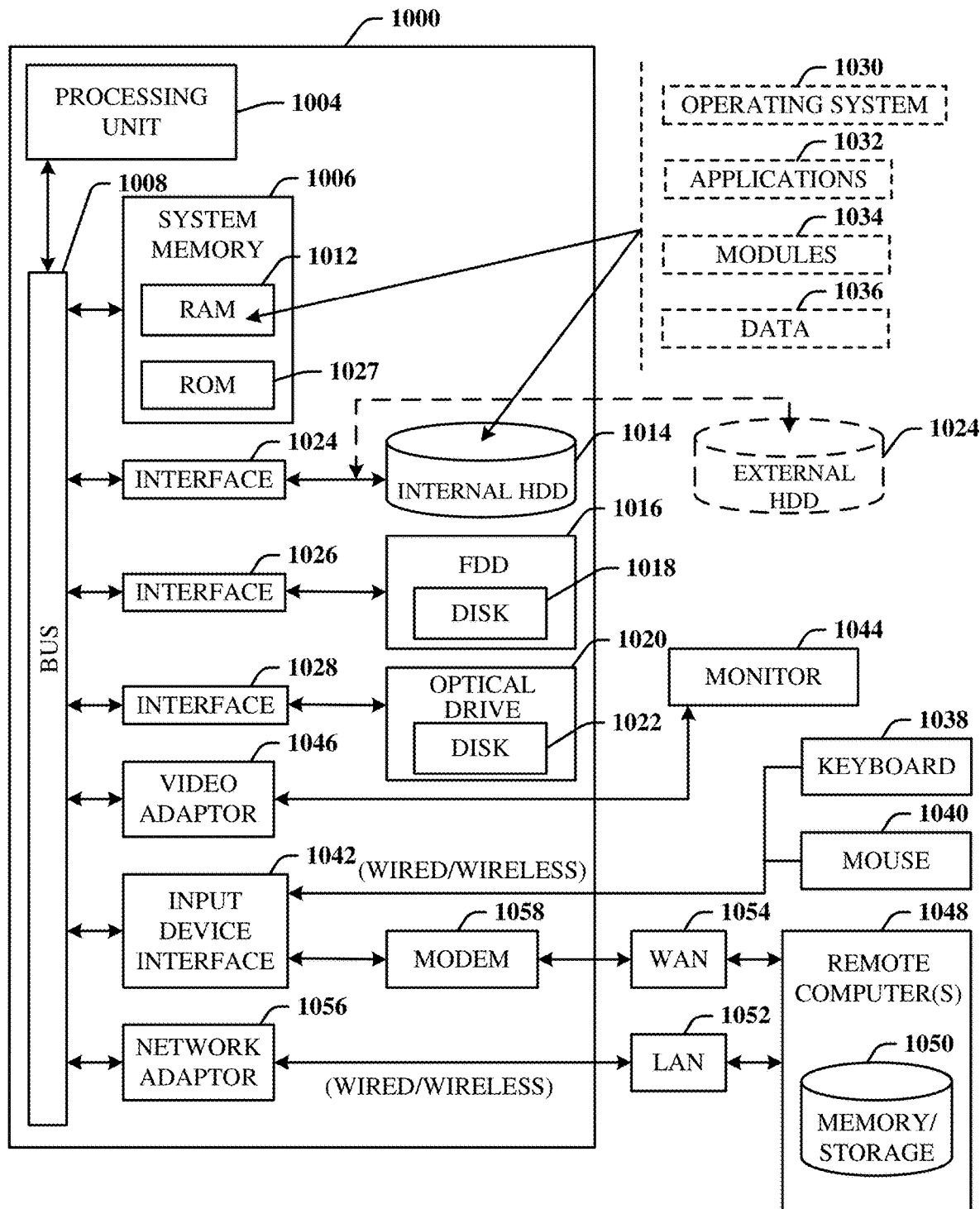
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by a wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so on), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at a 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), GSM, universal mobile telecommunications system (UMTS), worldwide interoperability for microwave access (WiMAX), enhanced general packet radio service (enhanced GPRS), 3GPP long term evolution (LTE), 3GPP2 ultra mobile broadband (UMB), high speed packet access (HSPA), Z-Wave, Zigbee and other 802.XX wireless technologies and/or legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
evaluating, by a user equipment, a quantity of low-density parity-check code decoding iterations utilized to decode a signal received via a downlink shared channel, wherein the evaluating comprises determining that the quantity of low-density parity-check code decoding iterations satisfies a defined threshold number of iterations over a defined time interval;
based on the quantity of low-density parity-check code decoding iterations satisfying the defined threshold number, determining, by the user equipment, a receiving beam is to be changed from a first receiving beam to a second receiving beam, wherein the evaluating and the determining are performed independently of any instruction received from network equipment; and
changing, by the user equipment, the receiving beam from the first receiving beam to the second receiving beam.

2. The method of claim 1, where the evaluating further comprises:
based on gyroscope data, determining that an orientation of the user equipment has switched between a back facing orientation and a front facing orientation.

3. The method of claim 1, further comprising:
based on the determining indicating that the receiving beam is to be changed, facilitating, by the user equipment, a transmission, to the network equipment, of a request to perform a beam management procedure.

4. The method of claim 3, wherein the facilitating comprises using a previously unused combination of channel state information to indicate the request to perform the beam management procedure.

5. The method of claim 3, wherein the transmission comprises the transmission of the request via a reserved random access channel state corresponding to a contention-free random access channel resource.

6. The method of claim 3, wherein the transmission comprises the transmission of the request at a first available transmission opportunity by including the request in uplink control information on an uplink shared control channel.

7. The method of claim 3, further comprising:
in response to the request, facilitating, by the user equipment, receiving, from the network equipment, a notification to perform the beam management procedure; and
reporting, by the user equipment, respective reference signal received power measurements for transmit beams.

8. The method of claim 1, wherein the downlink shared channel is a channel configured to operate according to a new radio network communication protocol.

9. A system, comprising:
a processor; and
a memory that stores executable instructions that, when executed by the processor, facilitate performance of operations, the operations comprising:
determining that a receiving beam is to be changed from a first receiving beam to a second receiving beam, wherein the receiving beam is utilized to receive, at a user equipment, a signal via a downlink shared channel; and
transmitting, to network equipment, a request for authorization to perform an on-demand beam management procedure at the user equipment, wherein the on-demand beam management procedure replaces periodic transmissions of beam management reference signals by the network equipment, and wherein the transmitting comprises including the request for authorization with uplink control information on an uplink shared control channel.

10. The system of claim 9, wherein the transmitting further comprises using a previously unused combination of channel state information to indicate the request for authorization.

11. The system of claim 9, wherein the transmitting further comprises transmitting the request for authorization via a reserved random access channel state corresponding to a contention-free random access channel resource.

12. The system of claim 9, wherein the determining comprises:
determining that a quantity of low-density parity-check code decoding iterations utilized to decode the signal, over a defined time range, satisfies a function of a defined threshold number of iterations.

13. The system of claim 9, wherein the operations further comprise:

receiving, in response to the request for authorization, an instruction to perform the on-demand beam management procedure; and reporting respective reference signal received power measurements for identified transmit beams.

14. The system of claim 9, wherein the transmitting comprises transmitting the request for authorization via at least a fifth generation network communication protocol.

15. A non-transitory machine-readable medium, comprising executable instructions that, when executed by a processor of a user equipment, facilitate performance of operations, the operations comprising:

receiving a signal via a first receiving beam selected from a group of receiving beams;

determining that a beam utilized to receive subsequent signals is to be changed from the first receiving beam to a second receiving beam of the group of receiving beams;

transmitting, to network equipment, a request for authorization to perform an on-demand beam management procedure for a selection of the second receiving beam from the group of receiving beams;

in response to the request for authorization, receiving an indication from the network equipment to perform the on-demand beam management procedure;

updating a previously reported beam management reference signal received power; and refreshing a receiver beam selection at the user equipment.

16. The non-transitory machine-readable medium of claim 15, wherein the determining comprises:

determining that a quantity of low-density parity-check code decoding iterations used to decode the signal satisfies a defined threshold number of iterations over a defined time interval.

17. The non-transitory machine-readable medium of claim 15, wherein the on-demand beam management procedure replaces periodic transmissions of beam management reference signals by the network equipment.

* * * * *